(12) United States Patent
Camilleri et al.

(10) Patent No.: US 11,642,686 B2
(45) Date of Patent: May 9, 2023

(54) APPARATUS AND A METHOD FOR FORMING 3D OBJECTS

(71) Applicant: EFFUSIONTECH IP PTY. LTD., Dandenong (AU)

(72) Inventors: Steven Camilleri, Darwin (AU); Byron Kennedy, Chelsea (AU)

(73) Assignee: EFFUSIONTECH IP PTY. LTD., Dandenong (AU)

(*) Notice: Subject to any disclaimer, the term of this patent is extended or adjusted under 35 U.S.C. 154(b) by 57 days.

(21) Appl. No.: 17/308,374

(22) Filed: May 5, 2021

(65) Prior Publication Data

US 2021/0268529 A1 Sep. 2, 2021

Related U.S. Application Data

(63) Continuation of application No. 15/579,044, filed as application No. PCT/AU2016/050482 on Jun. 13, 2016, now abandoned.

(30) Foreign Application Priority Data

Jun. 11, 2015 (AU) ................................ 2015902288

(51) Int. Cl.
*B05B 13/02* (2006.01)
*B33Y 40/00* (2020.01)
(Continued)

(52) U.S. Cl.
CPC ........ *B05B 13/0221* (2013.01); *B05B 7/1486* (2013.01); *B05B 12/122* (2013.01);
(Continued)

(58) Field of Classification Search
CPC . B05B 13/0221; B05B 7/1486; B05B 12/122; B05B 13/0278; B05B 12/00;
(Continued)

(56) References Cited

U.S. PATENT DOCUMENTS 7,654,223 B2 * 2/2010 Kim ..................... C23C 24/04
118/308
8,261,444 B2 9/2012 Calla et al.
(Continued)

FOREIGN PATENT DOCUMENTS

CN 103465475 A 12/2013
CN 103521769 A 1/2014
(Continued)

OTHER PUBLICATIONS

Sulzer Metco, Product Data Sheet: Kinetiks 4000 Cold Spray Gun [retrieved from internet on Aug. 1, 2016], <ULR: http://metco.infocentricresearch.com/en/-/media/documents/productsandservices/coating_equipment/thermal_spray/productinformation/dse_0041_kinetiks4000qun_v2.pdf>.

*Primary Examiner* — Galen H Hauth
*Assistant Examiner* — Shibin Liang
(74) *Attorney, Agent, or Firm* — Welsh Flaxman & Gitler LLC

(57) ABSTRACT

Apparatus for forming a 3D object from powder, comprising: a) delivery means adapted to emit a flow of powder at sufficiently high velocity to enable it to form the 3D object; b) positioning means adapted adjust the position of the delivery means; and c) control means adapted to control: i) movement of the positioning means; and ii) the velocity of the flow of powder.

8 Claims, 4 Drawing Sheets

(51) Int. Cl.
*B22F 12/53* (2021.01)
*B22F 10/85* (2021.01)
*B05B 7/14* (2006.01)
*B05B 12/12* (2006.01)
*C23C 24/04* (2006.01)
*B33Y 30/00* (2015.01)
*B33Y 10/00* (2015.01)
*B05B 12/00* (2018.01)
*B22F 3/115* (2006.01)
*B29C 64/321* (2017.01)
*B33Y 50/02* (2015.01)

(52) U.S. Cl.
CPC .......... *B05B 13/0278* (2013.01); *B22F 10/85* (2021.01); *B22F 12/53* (2021.01); *B33Y 40/00* (2014.12); *C23C 24/04* (2013.01); *B05B 12/00* (2013.01); *B22F 3/115* (2013.01); *B22F 2999/00* (2013.01); *B29C 64/321* (2017.08); *B33Y 10/00* (2014.12); *B33Y 30/00* (2014.12); *B33Y 50/02* (2014.12); *Y02P 10/25* (2015.11)

(58) Field of Classification Search
CPC .......... B05B 7/16; B22F 3/1055; B22F 3/115; B22F 2003/1056; B22F 2999/00; B22F 3/02; C23C 24/04; B33Y 10/00; B33Y 30/00; B33Y 40/00; B33Y 50/00; Y02P 10/295; B29C 64/321; B05C 11/00; B05D 1/12
See application file for complete search history.

(56) References Cited

U.S. PATENT DOCUMENTS

| | | | | |
|---|---|---|---|---|
| 9,765,435 | B2 * | 9/2017 | Zahiri | .................. B05B 7/1613 |
| 2010/0143700 | A1 | 6/2010 | Champagne et al. | |
| 2015/0321217 | A1 | 11/2015 | Nardi et al. | |
| 2016/0107231 | A1 * | 4/2016 | Doye | ....................... B22F 3/04 |
| | | | | 425/78 |
| 2017/0297097 | A1 | 10/2017 | Gibson et al. | |

FOREIGN PATENT DOCUMENTS

| | | | | |
|---|---|---|---|---|
| CN | 104023925 | A | | 9/2014 |
| CN | 104416572 | A | | 3/2015 |
| CN | 104985813 | A | | 10/2015 |
| DE | 102004041671 | A1 | | 3/2006 |
| DE | 102013216439 | | * 11/2014 | ............... C23C 4/12 |
| DE | 102013216439 | A1 | | 11/2014 |
| EP | 2206804 | | * 12/2009 | ............ C23C 24/04 |
| EP | 2206804 | A1 | | 7/2010 |
| JP | 2013142176 | A | | 7/2013 |
| WO | 2013149291 | A1 | | 10/2013 |
| WO | 2014116254 | A1 | | 7/2014 |
| WO | 2015020939 | A1 | | 2/2015 |
| WO | 2015157816 | A1 | | 10/2015 |
| WO | 2016197208 | A1 | | 12/2016 |

* cited by examiner

APPARATUS AND A METHOD FOR FORMING 3D OBJECTS

RELATED APPLICATIONS

This application is continuation of U.S. patent application Ser. No. 15/579,044, filed Dec. 1, 2017, which is a national stage filing under 35 U.S.C. 371 of International Application No.: PCT/AU2016/050482, filed Jun. 13, 2016, which claims priority to AU 2015902288, filed Jun. 11, 2015, the entire teachings of which are incorporated herein by reference. International Application No.: PCT/AU2016/050482 was published under PCT Article 21(2) in English.

FIELD OF INVENTION

This invention relates to apparatus and a method for forming 3D objects from a stream of powder.

BACKGROUND

It is known to 'cold spray' or 'supersonic spray' powder, for example metallic powder, at rates of 500 to 1,000 ms' onto objects to give them a protective coating. However for all functional purposes these are only 2D coatings and are not used to provide 3D characteristics. Known devices for applying such 2D coatings are not able to control the relationship between the path of the powder and the object it contacts sufficiently to enable 3D production. To the best of the applicant's knowledge it has not occurred to those in the art to develop a 3D production technique based on sprayed powder.

While 3D printing is known, it was not known to cold spray particles at high velocity from a powdered feedstock to a build platform to create a 3D object. The applicant has discovered that by appropriately controlling the disposition of a substrate with respect to a powder stream, a targeted 3D object can be conveniently formed. Although a preferred embodiment of the invention goes at least some way towards addressing this, it should be understood that this is not the object of the invention per se. The object of the invention in its broadest sense is simply to provide the public with a useful choice.

The term "comprising" if and when used in this document in relation to a combination of features or steps should not be taken to rule out the option of there being other features or steps. The term should not be interpreted in a limiting way.

SUMMARY OF INVENTION

According to one aspect the invention relates to apparatus for forming a 3D object from powder, comprising:
a) delivery means adapted to emit a flow of powder at sufficiently high velocity to enable it to form the 3D object;
b) positioning means adapted adjust the position of the delivery means (eg relative to a substrate); and
c) control means adapted to control:
  i) movement of the positioning means; and
  ii) the velocity of the flow of powder.

Optionally the delivery means is able to adjust the temperature and/or pressure of the powder (eg by adjusting the temperature and/or pressure of an entraining gas) and the control means is adapted to control the extent to which the delivery means does this.

Optionally the positioning means incorporates a spray head.

Optionally the positioning means incorporates a platform suitable for supporting the 3D object as it forms.

Optionally the control means is adapted to receive and interpret data defining the geometry of the 3D object prior to it being formed.

Optionally the apparatus has sensing means adapted to sense one or more geometric characteristics of the 3D object as it is being formed and to communicate this/these to the control means such that the control means causes one or more of the following to change:
a) the position of the delivery means;
b) the velocity of the powder; and
c) the temperature of the powder.

Optionally a geometric characteristic sensed is the height of the 3D object as it is being formed.

Optionally the delivery means is adapted to deliver more than one type of powder dependent on instructions from the control means.

Optionally the positioning means incorporates a robotic arm.

Optionally the positioning means is adapted to adjust the distance and/or angle between the delivery means and the platform, and the control means is adapted to control this.

According to a further aspect of the invention relates to use of apparatus as set out in any of the summary paragraphs above to form a 3D object, wherein the control means causes one or more of the following to change during formation of the object so as to give it one or more predetermined characteristics:
a) the position of the delivery means;
b) the velocity of the powder; and
c) the temperature of the powder.

Optionally at least two of a), b) and c) change during formation of the 3D object.

Optionally all three of a), b) and c) change during formation of the 3D object.

Optionally the powder is a cold spray powder.

Optionally the powder leaves the delivery means at a speed of 500 ms$^{-1}$ to 1,000 ms$^{-1}$.

Optionally the 3D object is formed by applying a sequence of layers of the powder by way of the delivery means.

Optionally the positioning means comprises an arm having means to grip the substrate.

Optionally the control means comprises a computerised system adapted to send control signals to the delivery means and to the positioning means dependent on the 3D object to be formed.

Optionally the powder is substantially metallic.

Optionally the powder is at a temperature of 0° C. to 500° C.

Optionally the powder is at a temperature of 25° C. to 500° C.

Optionally the powder is at a temperature of 25° C. to 300° C.

Optionally the powder comprises particles having an average size of 5μ to 50μ.

Optionally the angle and distance between the delivery means and the 3D object changes as it is being formed.

DRAWINGS

Some preferred embodiments of the invention will now be described by way of example and with reference to the accompanying drawings, of which:

DETAILED DESCRIPTION

Figure 1:
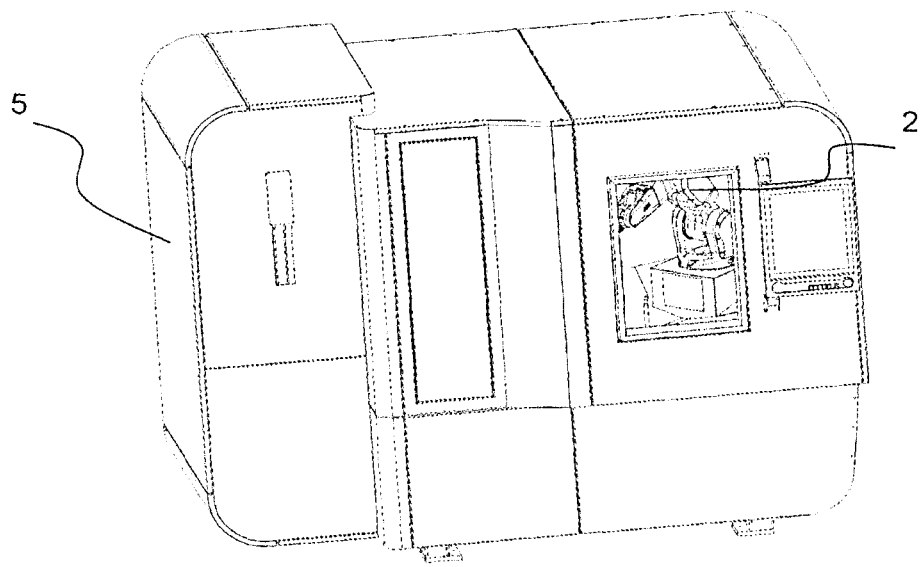
FIG. 1 is an isometric view of a 3D printer.
Figure 2:
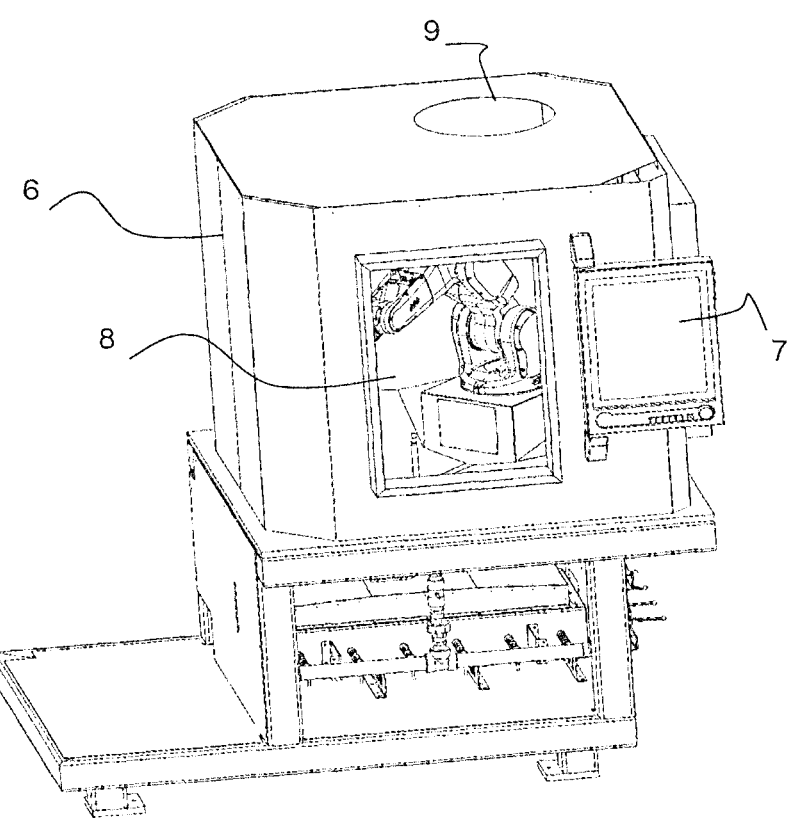
FIG. 2 is an isometric view showing certain internal parts of the printer.
Figure 3:
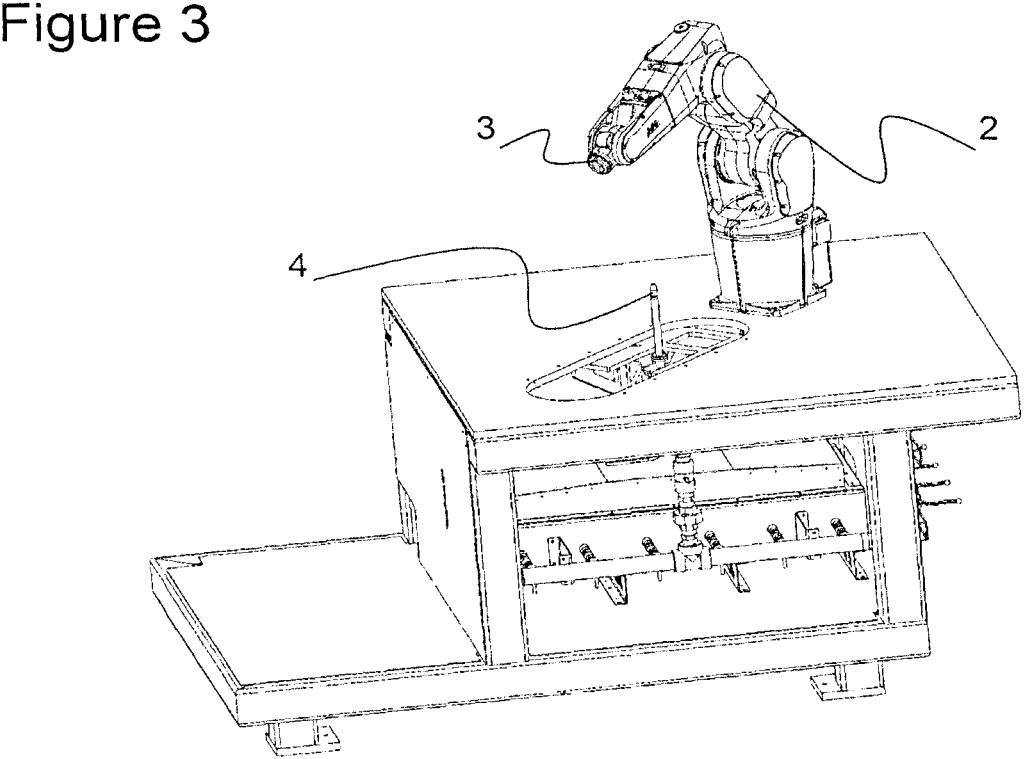
FIG. 3 is an isometric view showing detail of some parts of the printer.

With reference to FIGS. 1-3, and particularly FIG. 3, the 3D printer 1 has a robotic arm 2 having a grip 3 for holding a substrate (not shown), and a spray nozzle 4. When the printer is in use the substrate is held by the grip 3 and a high velocity flow of heated pressurised air or other gas is emitted from the nozzle 4. A feeder feeds metallic or other powder to the air so that it also leaves the nozzle at high velocity and contacts the substrate.

The velocity and temperature of the powder leaving the nozzle 4 can be regulated continuously to vary the adhesion characteristics of the powder, for example between different layers applied to the substrate. Varying the velocity and temperature allows for selection and control of temper, for example the hardness and resilience of all or part of the finished product. For example in the case of a gear wheel it may be desirable to have a relatively resilient centre to cope with load shocks, and a harder outer surface to resist wear. The exact velocity chosen will in each case depend, among other things, on the type of powder used and the nature of the 3D object to be formed, for example in terms of hardness and density, etc. By way of example, velocities of about 500 $ms^{-1}$ have been found useful for spraying 25 μm copper powder onto an aluminium substrate at 25° C. Velocities of about 200 $ms^{-1}$ have been found useful for spraying 25 μm tin powder onto an aluminium substrate at 25° C., and velocities of about 400 C for spraying 25 μm copper powder onto a copper substrate at 25° C. If the velocity is increased too far above a critical level then it can have the effect of wasting energy or undesirably eroding material from a substrate. However, again, the velocity depends on the materials, conditions and target 3D object in each case, and may change for different parts of the 3D object as it is formed.

The arm 2 is adjustable so that the powder moves in a vector of desired distance and angle to contact the substrate in a manner suited to forming a desired product. As layers of the powder build up on the substrate the arm 2 reorients to maintain an optimal distance and angle.

Referring to FIG. 1, the printer is housed within an easily managed enclosure 5. FIG. 2 illustrates the printer without the enclosure, and in particular within a build chamber 6. The build chamber supports a computerised system with an interface 7 for setting and providing manually generated or automatic computerised control commands to the robotic arm 2 and spray nozzle 4. The chamber 6 has a window 8 for conveniently viewing the printer when in use and an upper vent 9 to allow for escape of hot air.

The computerised system may be adapted to interpret CAD drawings and use these to determine the type and number of control signals sent to the robotic arm 2 and spray nozzle 4.

Figure 4:
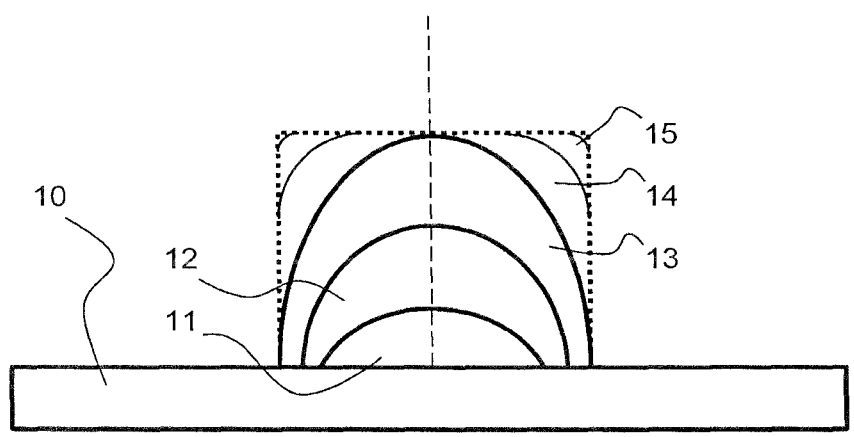
FIG. 4 illustrates the manner in which an object may be formed by way of the printer.

FIG. 4 schematically illustrates a substrate 10 on which a cylinder has been formed about an axis 6. The cylinder has been created in powder deposition steps or layers 11-15. As illustrated, the cylinder has not been built in a directly linear manner by rather in an 'inflated' manner, where each layer combines to produce the overall linear vertical dimension.

The 3D printer is preferably formed to work at high speed and so that it can print metallic or other objects accurately from the powder with minimal restrictions in terms of the geometry of the objects.

Preferably the robotic arm 2 causes a beam of the powder to moves across the surface of the substrate so that the beam remains substantially perpendicular to its point of contact of the substrate. This is enabled by the control functions of the printer's computerised system. The printer also enables the angle of the beam to be reoriented to less than perpendicular if need be, for example in order to form the desired 3D shape.

In some embodiments of the invention the robotic arm 2 may comprise a five axis CNC frame or a six axis industrial arm. The selection of one or the other may depend on whether speed or accuracy is the most important consideration.

In a preferred embodiment the build chamber 6 serves to physically contain excess powder to enable it to be collected and reused or recycled. The chamber 6 also keeps powder away from nearby equipment that can be damaged by exposure to the powder.

In some embodiments of the invention the amount of excess powder is sensed and control parameters adjusted to reduce it, and therefore the risk of associated hazards.

In preferred embodiments of the invention it is desirable for the substrate or spray nozzle 4, or both, to be attached to a motion control system that can continuously re-orient and maintain the angle of attack of the beam of powder generally perpendicular. In addition, a digital control system may process a targeted 3D object geometry and generate appropriate tool paths that facilitate deposition to result in a 3D item that best matches the targeted geometry.

Figure 5:
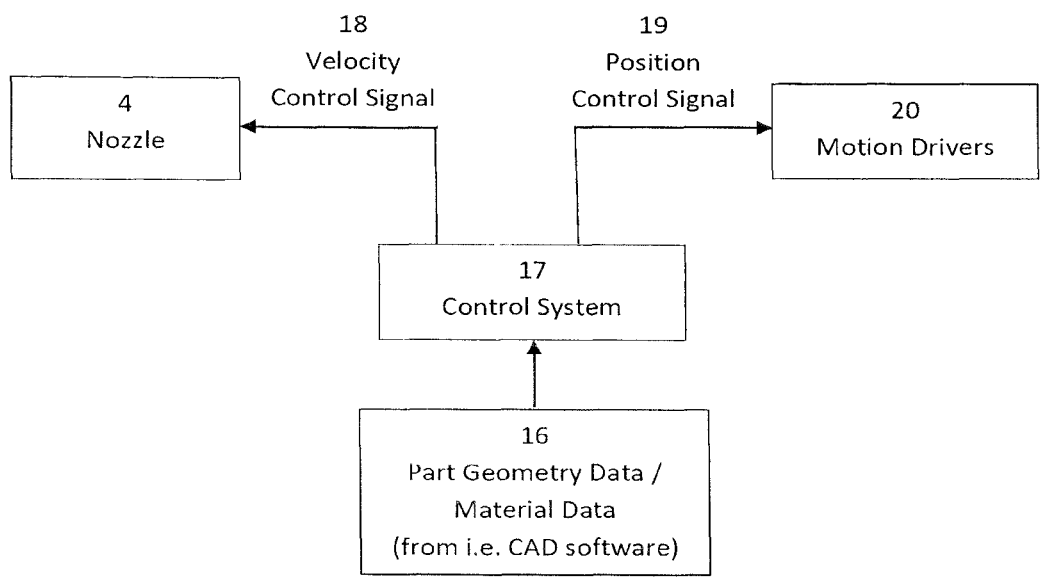
FIG. 5 is a flow diagram illustrating control functions of the printer.

FIG. 5 illustrates a preferred manner in which the computerised system communicates with the robotic arm 2 and spray nozzle 4. For example CAD software 16 communicates data reflecting design instructions to a computerised control system 17. Based on the design instructions, the control system 17 sends velocity control signals 18 to that determine the velocity of powder leaving the nozzle 4 (the signals may also control powder temperature and pressure). Also based on the design instructions, the control system sends position control signals 19 motion drivers 20 to control the angle and distance of the nozzle 4 with respect to the 3D object as it forms.

In some preferred embodiments of the invention the printer incorporates a sensor adapted to monitor the geometry of a 3D object as it is formed, for example its height characteristics, and provide feedback to the computerised system to make adjustments to the powder velocity, temperature or dwell time, or the distance or angle between the nozzle 4 and the substrate, to more accurately control the geometry of the finished product. This assists in dealing with unforeseen or known confounding factors.

Preferably the computerised control system 17 provides for rapid stopping and starting of the flow of powder. Solenoid blocking controls for the powder feed may be used to facilitate this, together with means to adjust the feed of powder in terms of the quantity released.

Figure 6:
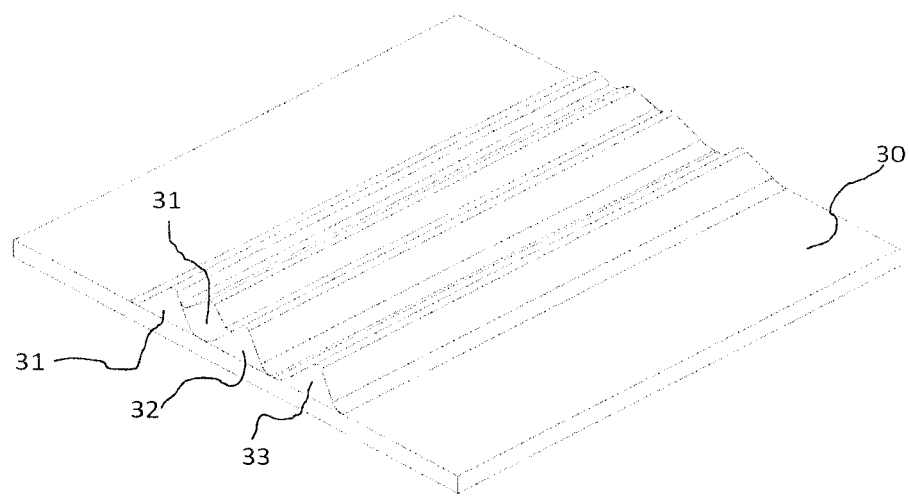
FIG. 6 is an isometric view of a 3D object being formed from a substrate.

FIG. 6 illustrates a substrate 30 with spray powder material deposited on it. The powder is metallic and has been deposited in straight lines 32, 32, 33 and 34. In this case each line is the result of a single pass of the spray nozzle. The lines 31, 32 and 33 are deposited first, with line 34 being deposited on lines 31 and 32. The substrate and lines are formed from different metallic substances in this example. Line 30 is formed from aluminium powder, and lines 31, 32 and 33 from copper powder; all at a powder deposition velocity of 500 ms$^{-1}$. The other line 34 is also copper and is deposited at a powder velocity of 400 ms$^{-1}$ given that uses the lines 31 and 32 for a substrate.

In some embodiments of the invention the printer incorporates a mechanical hanger for holding a 3D product as it is created. It is desired that material attaching the 3D product to the hanger be different to the sprayed powder so that the finished product can be easily separated from the hanger. In at least some situations the attaching material may be PLA (poly lactic acid plastic) or some suitable alternative. The attaching material may be applied through a separate high speed nozzle and may be suitable for use as an isolating first layer applied to a substrate platform to protect it.

In some embodiments of the invention there may be multiple powder feeders each adapted to deliver a different type of powder to the nozzle. The computerised control system controls switching from one powder to another to give an end product of desired characteristics.

In preferred embodiments of the invention the control system has or receives data determining the geometry, particle speed (dependant on the powder and substrate materials) at each point in time during fabrication, and controls the speed and angle of, and distance to, particle strike, causing these to vary as desired of needed for manufacturing reproducibility.

While some preferred embodiments have been described by way of example it should appreciated that modifications and improvements can occur without departing from the scope of the invention.

The invention claimed is:

1. A method for forming a 3D object via an apparatus including a nozzle that emits a spray of powder at 500 ms$^{-1}$ to 1000 ms$^{-1}$ and a robotic arm including motion driven that control movement of the robotic arm to move a substrate attached to the robotic arm such that the robotic arm reorients as sprayed powder builds upon the substrate, the method comprising:

receiving and interpreting, by a control system, data defining a geometry of the 3D object to be formed;

determining, by the control system, control signals to be sent to the robotic arm and control signals to be sent to the nozzle;

sending, by the control system, control signals to motion drivers of the robotic arm during formation of the 3D object to control movement of the robotic arm, wherein sending control signals to the motion drivers includes moving the robotic arm to adjust an angle and a distance between the substrate and the nozzle during formation of the 3D object so that the powder moves in a vector of desired distance and angle to contact the substrate in a manner suited to forming the 3D object on the substrate from the powder;

sending, by the control system, control signals to the nozzle during formation of the 3D object to continuously control a velocity of and temperature of the powder delivered by the nozzle during formation of the 3D object, wherein sending control signals to the nozzle includes regulating adhesion characteristics of the powder and/or causing different parts of the object to have different hardness and/or resilience through adjustments in the velocity and temperature of the powder delivered by the nozzle;

for at least some of the time causing the powder to spray as a beam that remains substantially perpendicular to its point of contact with the substrate and for at least some time causing the powder to spray as a beam that is less than perpendicular to the point of contact with the substrate; and forming powder deposition layers in a nonlinear and unequal manner to produce an overall linear vertical dimension of the 3D object, wherein powder deposition steps or layers are not built in a directly linear manner but rather in an inflated manner, where each layer combines to produce the overall linear vertical dimension.

2. The method according to claim 1, further comprising sensing one or more geometric characteristics of the 3D object as it is being formed and changing the distance between the nozzle and the substrate, the angle between the nozzle and the substrate, dwell time of the spray, velocity of the powder, and/or the temperature of the powder during formation of the 3D object.

3. The method according to claim 2, wherein the one or more geometric characteristics includes sensing a height of the 3D object as it is being formed.

4. The method according to claim 3, further including delivering, by the nozzle, more than one type of powder dependent on instructions from the control means.

5. The method according to claim 3, wherein the powder is a cold spray powder.

6. The method according to claim 3, wherein the powder is delivered at a temperature of 25° C. to 300° C.

7. The method according to claim 3, wherein the powder comprises particles having an average size of 5μ to 50μ.

8. The method according to claim 3, wherein the powder is at a temperature of 0° C. to 300° C.

* * * * *